Patented Feb. 13, 1934

1,946,950

UNITED STATES PATENT OFFICE 1,946,950

MANUFACTURE OF 1-IODO-8-HYDROXY-NAPHTHALENESULPHONIC ACIDS

Arthur Stoll, August Binkert, and Walter Kussmaul, Basel, Switzerland, assignors to firm Chemical Works formerly Sandoz, Basel, Switzerland No Drawing. Application February 17, 1933, Serial No. 657,310, and in Switzerland February 29, 1932

9 Claims. (Cl. 260—155)

It has been found that 1-iodo-8-hydroxynaphthalenesulphonic acids can be prepared by substituting iodine for the diazo group in the respective 1-diazo-8-hydroxynaphthalenesulphonic acids. The process for the manufacture of the new compounds can for example be carried out by heating the diazo compounds with hydroiodic acid. Sometimes it is preferable to decompose the diazonium iodide by means of copper, but other suitable processes may also be used. The new compounds may be isolated from their solutions by salting them out or by concentrating the solution, whereby the new iodine derivatives precipitate.

1-iodo-8-hydroxynaphthalene sulphonic acids are more or less water soluble compounds which are colorless or slightly colored. Some of them may easily be recrystallized in form of their sodium salts from hot water. They can be used for therapeutical purposes and for the manufacture of therapeutical preparations.

The following examples, without being limitative, illustrate the present process, the parts being by weight.

Example 1

50 parts of 1.8-aminonaphthol-4-sulphonic acid are dissolved in 75 parts of 2-n caustic soda lye and 250 parts of ice and water are added. Thereupon the free aminonaphtholsulphonic acid is precipitated by an addition of 70 parts of 10-n sulphuric acid and diazotized by means of an addition of 10 parts of sodium nitrite dissolved in 40 parts of water. The diazo compound obtained is filtered, suspended in 250 parts of ice-water and 75 parts of hydroiodic acid of a specific weight of 1.7 are then added thereto. After addition of 10 parts of copper-bronze, nitrogen begins to evolve and the red color of the solution changes gradually to a light flesh-red. After the reaction is finished, the solution is filtered, the clear yellow filtrate is saturated with dry common salt and the precipitate obtained is recrystallized from 150 parts of boiling water. On cooling down greenish leaves are obtained, which are separated by filtration and dried; they contain 34% of iodine and 9.2% of sulphur.

Instead of hydroiodic acid, it is also possible to use its suitable salts. The present process can then be carried out for example in the following manner: To the strong acid suspension of the diazo compound is added an appropriate amount of potassium iodide, whereby hydroiodic acid is formed and reacts with the diazo compound.

Example 2

The filtrated diazonium salt prepared from 36 parts of 1.8-aminonaphthol-4.6-disulphonic acid is suspended in 200 parts of ice-water and treated with 40 parts of concentrated hydroiodic acid. Then to this mass are added while well stirring 10 parts of copper-bronze. The mass foams very strongly and is decolorized. The thus obtained 1-iodo-8-hydroxynaphthalene-4.6-disulphonic acid can be isolated from its aqueous solution by means of common salt.

Example 3

40 parts of dry 1-diazo-8-hydroxynaphthalene-3.6-disulphonic acid are suspended in 100 parts of water and 30 parts of concentrated hydroiodic acid are added thereto. By raising the temperature slowly on the water bath, evolution of nitrogen takes place; the same is finished at about 70° C. After cooling down the reaction product is treated with ether and the aqueous solution saturated with dry common salt. After some time, the precipitate thus obtained is squeezed out and recrystallized from boiling water, whereby considerable quantities of a light-grey powder, easily soluble in water, are obtained.

What we claim is:—

1. A process for the manufacture of 1-iodo-8-hydroxynaphthalene sulphonic acids, consisting in heating in an aqueous medium the diazonium iodides of 1-diazo-8-hydroxynaphthalene sulphonic acids.

2. A process for the manufacture of 1-iodo-8-hydroxynaphthalene sulphonic acids, consisting in heating in an aqueous medium the diazonium iodides of 1-diazo-8-hydroxynaphthalene sulphonic acids in presence of copper.

3. A process for the manufacture of 1-iodo-8-hydroxynaphthalene-4-sulphonic acid, consisting in heating in an aqueous medium the diazonium iodide of 1-diazo-8-hydroxynaphthalene-4-sulphonic acid in presence of copper powder.

4. A process for the manufacture of 1-iodo-8-hydroxynaphthalene-4:6-disulphonic acid, consisting in heating in an aqueous medium the diazonium iodide of 1-diazo-8-hydroxynaphthalene-4:6-disulphonic acid with copper powder.

5. A process for the manufacture of 1-iodo-8-hydroxynaphthalene-3:6-disulphonic acid, consisting in heating in an aqueous medium the diazonium iodide of 1-diazo-8-hydroxynaphthalene-3:6-disulphonic acid.

6. The 1-iodo-8-hydroxynaphthalene sulphonic acids, which are in dry state slightly colored crystallized compounds, that are soluble in water and are usable for therapeutical purposes and as intermediates for the manufacture of therapeutical products.

7. The 1-iodo-8-hydroxynaphthalene-4-sulphonic acid, which is in dry state a water soluble compound, crystallizing in form of greenish leaves, which contains about 36% of iodine and which is usable for therapeutical purposes and as intermediate for the manufacture of therapeutical products.

8. The 1-iodo-8-hydroxynaphthalene-4:6-sulphonic acid, which is in dry state a greenish water soluble compound, containing about 28% of iodine and which is usable for therapeutical purposes and as intermediate for the manufacture of therapeutical products.

9. The 1-iodo-8-hydroxynaphthalene-3:6-disulphonic acid, which is in dry state a greyish water-soluble compound, containing about 28% of iodine and which is usable for therapeutical purposes and as intermediate for the manufacture of therapeutical products.

ARTHUR STOLL.
AUGUST BINKERT.
WALTER KUSSMAUL.